(12) United States Patent
Davies et al.

(10) Patent No.: US 10,137,641 B2
(45) Date of Patent: Nov. 27, 2018

(54) THREE-DIMENSIONAL OBJECT AND METHOD OF MANUFACTURING THEREOF

(71) Applicant: Guangzhou Lite-on Mobile Electronic Components Co., Guangzhou (CN)

(72) Inventors: Stuart Davies, Copenhagen (DK); Ze-Yan Zhao, Songzi (CN)

(73) Assignee: GUANGZHOU LITE-ON MOBILE ELECTRONIC COMPONENTS CO., Guangzhou (CN)

( * ) Notice: Subject to any disclaimer, the term of this patent is extended or adjusted under 35 U.S.C. 154(b) by 307 days.

(21) Appl. No.: 14/953,293

(22) Filed: Nov. 27, 2015

(65) Prior Publication Data

US 2016/0167300 A1  Jun. 16, 2016

(30) Foreign Application Priority Data

Dec. 15, 2014  (CN) .......................... 2014 1 0778629

(51) Int. Cl.
| | |
|---|---|
| *B05B 13/04* | (2006.01) |
| *B05B 12/12* | (2006.01) |
| *B05D 1/02* | (2006.01) |
| *B29C 67/00* | (2017.01) |
| *B22F 3/00* | (2006.01) |
| *B33Y 10/00* | (2015.01) |
| *B33Y 80/00* | (2015.01) |

(52) U.S. Cl.
CPC ...... *B29C 67/0059* (2013.01); *B05B 13/0426* (2013.01); *B22F 3/008* (2013.01); *B29C 67/0088* (2013.01); *B05B 12/124* (2013.01); *B05D 1/02* (2013.01); *B33Y 10/00* (2014.12); *B33Y 80/00* (2014.12)

(58) Field of Classification Search
CPC ...... B05B 13/0426; B05B 12/124; B05D 1/02
See application file for complete search history.

(56) References Cited

U.S. PATENT DOCUMENTS

| | | | | |
|---|---|---|---|---|
| 4,830,882 | A | * | 5/1989 | Ichinose et al. |
| 5,240,745 | A | * | 8/1993 | Yamamoto et al. |
| 5,248,341 | A | * | 9/1993 | Berry, Jr. et al. |
| 5,814,375 | A | * | 9/1998 | Hissen et al. |
| 6,096,132 | A | * | 8/2000 | Kaiba et al. |
| 6,159,296 | A | * | 12/2000 | Aoyama et al. |
| 6,360,656 | B2 | * | 3/2002 | Kubo et al. |
| 6,562,139 | B2 | * | 5/2003 | Morton |

(Continued)

*Primary Examiner* — Cachet I Sellman
(74) *Attorney, Agent, or Firm* — Li & Cai Intellectual Property (USA) Office

(57) ABSTRACT

A method of manufacturing a three-dimensional object includes: providing a carrier which has a predetermined surface including a first surface, a second surface, and a third surface; and driving a discharging head to move on a work track and conduct a three-dimensional spread corresponding to the first surface, the second surface, and the third surface, wherein the predetermined surface and the work track have an identical spacing therebetween. Wherein the discharging head moves relative to the first surface using a first movement speed and conducts the three-dimensional spread, the discharging head moves relative to the second surface using a second movement speed and conducts the three-dimensional spread, the discharging head moves relative to the third surface using a third movement speed and conducts the three-dimensional spread.

9 Claims, 6 Drawing Sheets

(56) References Cited

U.S. PATENT DOCUMENTS

| | | |
|---|---|---|
| 7,922,272 B2 * | 4/2011 | Baird et al. |
| 8,545,943 B2 * | 10/2013 | Frankenberger ........... 427/427.1 |
| 2001/0005942 A1 * | 7/2001 | Patton et al. .................. 33/18.1 |
| 2002/0024544 A1 * | 2/2002 | Codos et al. ..................... 347/8 |
| 2003/0221615 A1 * | 12/2003 | Lastowka |
| 2005/0238794 A1 * | 10/2005 | Yang et al. |
| 2007/0095218 A1 * | 5/2007 | Strange |
| 2011/0262622 A1 * | 10/2011 | Herre |
| 2012/0249679 A1 * | 10/2012 | Beier et al. |
| 2013/0338632 A1 * | 12/2013 | Kaplan et al. |
| 2014/0065194 A1 * | 3/2014 | Yoo et al. |
| 2014/0284832 A1 * | 9/2014 | Novikov et al. |
| 2015/0367620 A1 * | 12/2015 | DeFillipi |

\* cited by examiner

THREE-DIMENSIONAL OBJECT AND METHOD OF MANUFACTURING THEREOF

BACKGROUND OF THE INVENTION

1. Field of the Invention

The instant disclosure relates to a method of manufacturing three-dimensional object, particularly to a method that can manufacture the three-dimensional object on a carrier having a curved surface.

2. Description of Related Art

One method of manufacturing a three-dimensional (3D) object is a 3D spraying process that can directly print the 3D object. In general, after a working data and a processing path are calculated and generated by a computer, a digital model file is used as a foundation to directly produce the 3D object. In simple terms, the 3D spraying process is utilized "layer by layer stacked" way to form the 3D object by bondable materials such as powdered metal or plastic, and such a 3D object can almost be formed into any shape. However, when a conventional 3D spraying process is utilized to produce the 3D object, due to a film being sprayed out on a carrier which has a curved surface or a small radius corner (sharp corner), and the sprayed film is liable to generate a section of small plates (or flake) through the abovementioned layer by layer stacked formation, so as to not form a continuous and uniform shape. Owing to the limitation of the shape of the small radius corner, the sprayed film on the curved surface would have thicker thickness and is uneven. These problems affect the accuracy of the sprayed 3D object.

SUMMARY OF THE INVENTION

The embodiments of the instant disclosure provide a method of manufacturing a three-dimensional object, particularly a method that can manufacture a three-dimensional object on a carrier having a curved surface or a small radius corner.

One of the embodiments of the instant disclosure provides a method of manufacturing the three-dimensional object which includes: providing a carrier which has a predetermined surface including a first surface, a second surface, and a third surface; and driving a discharging head to move on a work track and conduct a three-dimensional spread corresponding to the first surface, the second surface, and the third surface, wherein the predetermined surface and the work track have an identical spacing therebetween. Wherein the discharging head moves relative to the first surface using a first movement speed and conducts the three-dimensional spread, the discharging head moves relative to the second surface using a second movement speed and conducts the three-dimensional spread, the discharging head moves relative to the third surface using a third movement speed and conducts the three-dimensional spread, the first movement speed is identical to the third movement speed, and the second movement speed is different from the first and third movement speeds.

Another embodiment of the instant disclosure provides a method of manufacturing the three-dimensional object which includes: providing a carrier which has a predetermined surface including a first surface and a second surface; and driving a discharging head to move on a work track and conduct a three-dimensional spread corresponding to the first surface and the second surface, wherein the predetermined surface and the work track have an identical spacing therebetween. Wherein the discharging head moves relative to the first surface using a first movement speed and conducts the three-dimensional spread, the discharging head moves relative to the second surface using a second movement speed and conducts the three-dimensional spread, and the second movement speed is different from the first movement speed.

In summary, in this instant disclosure, when the discharging head moves on the work track, the movement speed of the discharging head is changed depending on whether the surface has a different curvature radius, so as to fix the problem with uneven film thickness of the carrier.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Embodiments of "method of manufacturing a three-dimensional object" disclosed in the instant disclosure are illustrated via specific examples as follows, and people familiar in the art may easily understand the advantages and efficacies of the instant disclosure by disclosure of the specification. The instant disclosure may be implemented or applied by other different specific examples, and each of the details in the specification may be applied based on different views and may be modified and changed under existence of the spirit of the instant disclosure. The figures in the instant disclosure are only for brief description, but they are not depicted according to actual size and do not reflect the actual size of the relevant structure. The following embodiments further illustrate related technologies of the instant disclosure in detail, but scope of the instant disclosure is not limited herein.

First Embodiment

Figure 1A:
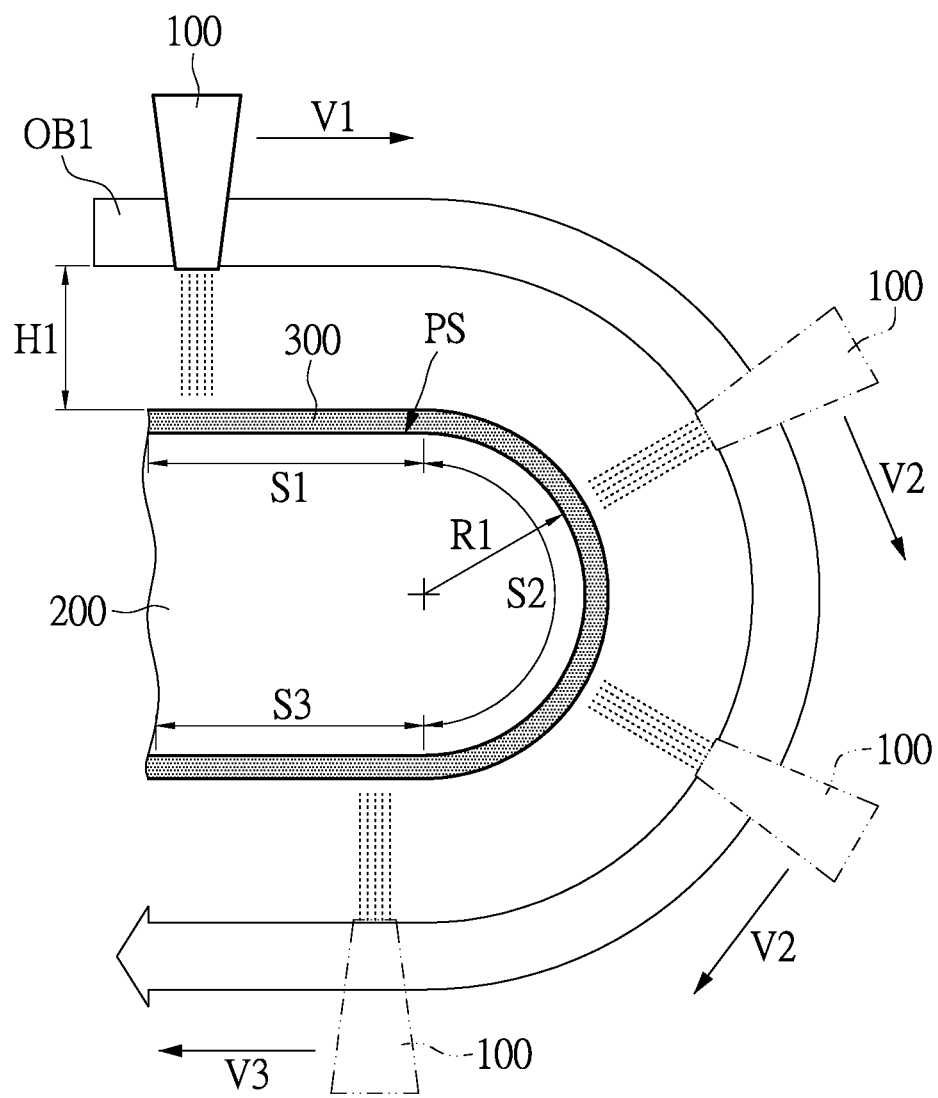
FIG. 1A shows a simple schematic view of a method of manufacturing a three-dimensional object of a first embodiment in the instant disclosure.
Figure 1B:
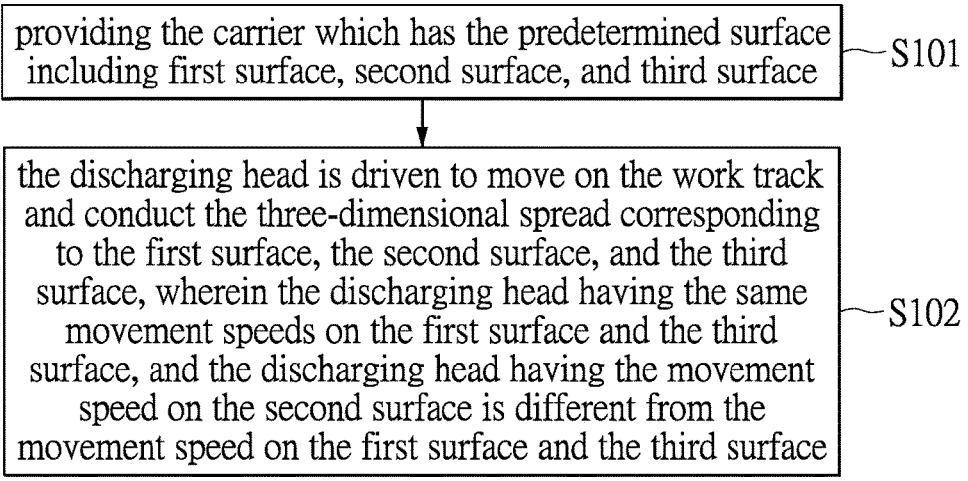
FIG. 1B shows a flow chart of one of the methods of manufacturing a three-dimensional object of a first embodiment in the instant disclosure.

Please refer to FIGS. 1A and 1B. FIG. 1A shows a simple schematic view of a method of manufacturing a three-dimensional object of a first embodiment in the instant disclosure. FIG. 1B shows a flow chart of one of the methods of manufacturing a three-dimensional object of a first embodiment in the instant disclosure. In this embodiment, the three-dimensional object is manufactured via a three-dimensional spread method or a three-dimensional spray method. Simply speaking, a movable device discharging head 100 is used to spread or spray a plurality layer of powered material on a carrier 200 on a working platform. A work track of the discharging head 100 is set and controlled to run with a speed along a series of directions, so as to gradually stack a three-dimensional object layer by layer.

In this embodiment, the main application is that, the three-dimensional spray method is utilized to manufacture a three-dimensional object on the carrier 200 which has a curved surface or a small radius corner (sharp corner), for example, an electrical wiring, an antenna, an insulating layer, or a coating layer. The carrier 200 can be made of various materials having a curved surface or a small radius corner, and is the substrate that the film 300 is formed thereon. The material of the carrier 200 can be plastic or metal, and the material of the film 300 can be ink. The material of the film 300 is selected by relating it to a predetermined surface PS of the carrier 200 having a geometric property (geometry), surface texture, and material property. In addition, the material of the film 300 is selected in regards to its wetting performance, in that, when the liquid (such as material of film 300) and solid (such as carrier 200) contact each other, its ability for wetting a surface of the solid. When the three-dimensional spray is utilized on the carrier 200 having a curved surface or small radius corner, the wetting performance of the material of the film 300 should be considered, that is, a balance of adhesion and cohesion force between the material of the film 300 and the carrier 200 should be considered. Therefore, the surface of the carrier 200 can be treated using corona discharge in advance before the three-dimensional spray process is conducted. The film 300 has a thickness between 5 to 20 μm.

In step S101, providing a carrier 200 which has a predetermined surface PS including a first surface S1, a second surface S2, and a third surface S3. Specifically, the three-dimensional object is manufactured on the predetermined surface PS of the carrier 200, and the second surface S2 of the carrier 200 is a curved surface or a small radius corner (sharp corner). In the embodiment of the instant disclosure, the predetermined surface PS includes the first surface S1, the second surface S2, and the third surface S3. The first surface S1, the second surface S2, and the third surface S3 are connected in series with each other, wherein the second surface S2 has a first radius R1. In a first embodiment, the second surface S2 is a semicircle surface, but it is not limited in this instant disclosure. For example, the second surface S2 also can be a curved surface which has a different curvature radius.

In step S102, the discharging head 100 is driven to move on a first work track OB1 and conduct the three-dimensional spread corresponding to the first surface S1, the second surface S2, and the third surface S3, wherein the discharging head 100 having the same movement speed on the first surface S1 and the third surface S3, and the discharging head 100 having the movement speed on the second surface S2 is different from the movement speed on the first surface S1 and the third surface S3. Specifically, the discharging head 100 is driven to conduct the three-dimensional spread along the first work track OB1, the discharging head 100 sprays a jet stream which has uniform flow rate, a beam width of the jet stream is concentrated by controlling the flow rate of sheath gas, such that the film 300 formed on the predetermined surface PS has fine width and uniform thickness. The first work track OB1 corresponds to the first surface S1, the second surface S2, and the third surface S3 of the predetermined surface PS. The first work track OB1 moves in a tangential direction, where the discharging head 100 being in motion is parallel with a tangent plane of the predetermined surface PS. The first work track OB1 and the predetermined surface PS have a fixed identical vertical distance H1 therebetween, and the vertical distance H1 is between 2 to 5 mm.

In detail, the discharging head 100 is driven to move along the first work track OB1. When the position of the discharging head 100 corresponds to above the first surface S1, the first surface S1 is subjected to the three-dimensional spread with a first movement speed V1. Next, the discharging head 100 continuously moves along the first work track OB1, when the position of the discharging head 100 corresponds to above the second surface S2, the second surface S2 is subjected to the three-dimensional spread with a second movement speed V2. Then, the discharging head 100 continuously moves along the first work track OB1, when the position of the discharging head 100 corresponds to above the third surface S3, the third surface S3 is subjected to the three-dimensional spread with a third movement speed V3. The first movement speed V1, the second movement speed V2, and the third movement speed V3 are relative speeds between the discharging head 100 and the carrier 200. In practice, when carrying out the three-dimensional spread or the three-dimensional spray process, a relative movement direction between the discharging head 100 and the carrier 200 can be adjusted depending on a desired spreading/spraying shape of the film 300, but it is not limited in this instant disclosure. The speed among the first movement speed V1, the second movement speed V2, and the third movement speed V3 are related to the small radius corner and the predetermined surface PS of the carrier 200 having a geometric property (geometry), surface texture, and material property. In other words, the speed among the first movement speed V1, the second movement speed V2, and the third movement speed V3 is also related to the curvature radius of the second surface S2 and the predetermined surface PS of the carrier 200 having geometric property (geometry), surface texture, and material property. Additionally, in the first embodiment, since the first surface S1 and the third surface S3 are plane surfaces respectively, and the second surface S2 is a curved surface, therefore, the first movement speed V1 is identical to the third movement speed V3, and the second movement speed V2 is different from the first and third movement speeds V1, V3. In this embodiment, since the second surface S2 is a curved surface, the first movement speed V1 and third movement speeds V3 are both slower than the second movement speed V2. However, in other embodiments, the first movement speed V1 and third movement speeds V3 also can be both faster than the second movement speed V2. Due to the curvature radius of the second surface S2 is relatively smaller than that of the first surface S1 and the third surface S3 respectively, the second movement speed V2 is adjusted to differ from the first movement speed V1 and the third movement speeds V3, so as to control and to form the film 300 to have a uniform thickness. In practice, the value of the first movement speed V1, the second movement speed V2, and the third movement speed V3 of the discharging head 100 depend on the property of the predetermined surface PS of the carrier 200 e.g., the geometric property of the predetermined surface PS. In other embodiments, even if the first surface S1 and the second surface S2 are both plane surfaces, the first movement speed V1 and the second movement speed V2 also can be adjusted to differ their speeds. The method of manufacturing the three-dimensional object in this instant disclosure can be the following steps: spraying a plane surface, a plane surface, and a curved surface sequentially, but it is not limited in this instant disclosure.

Figure 2:
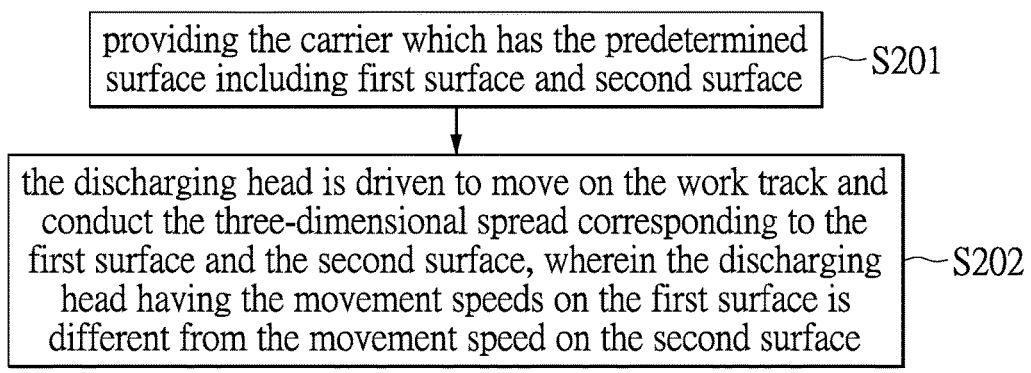
FIG. 2 shows a flow chart of another method of manufacturing a three-dimensional object of a first embodiment in the instant disclosure.

Please refer to FIGS. 2 and 1B. FIG. 2 shows a flow chart of another method of manufacturing a three-dimensional object of a first embodiment in the instant disclosure. In the first embodiment, even though the carrier 200 has a first surface S1 which is a plane surface, a second surface S2 which is a curved surface, and a third surface S3 which is a plane surface, in this instant disclosure, the carrier 200 can also only have a first surface S1 which is a plane surface and a second surface S2 which is a curved surface. Specifically, the method of manufacturing the three-dimensional object can include the following steps: in step S201, providing the carrier 200 which has the predetermined surface PS including a first surface S1 and a second surface S2. More specifically, the first surface S1 is a plane surface, the second surface S2 is a curved surface, and the first surface S1 and the second surface S2 are connected in series with each other.

Next, in step S202, the discharging head 100 is driven to move on the work track OB1 and conduct the three-dimensional spread corresponding to the first surface S1 and the second surface S2, wherein the discharging head 100 having the movement speed on the first surface S1 is different from the movement speed on the second surface S2. Specifically, when driving the discharging head 100 to move along the first work track OB1, the discharging head 100 is still subjected to the three-dimensional spread on the first and second surfaces S1, S2 sequentially, wherein the discharging head 100 having the movement speeds on the first surface S1 is different from the movement speed on the second surface S2. More specifically, when spraying on the first surface S1, the discharging head 100 moves relative to the first surface S1 with a first movement speed V1 to conduct the three-dimensional spread. When spraying on the second surface S2, the discharging head 100 moves relative to the second surface S2 with a second movement speed V2 to conduct the three-dimensional spread. Due to the first surface S1 and the second surface S2 have different curvature radiuses, the first movement speed V1 is distinct from the second movement speed V2. As shown in FIG. 1B, due to the curvature radius of the second surface S2 being smaller than that of the first surface S1, therefore, the first movement speed V1 of the discharging head 100 of this embodiment on the first surface S1 would be smaller than the second movement speed V2 of the discharging head 100 of this embodiment on the second surface S2.

In addition, the first work track OB1 moves in the tangential direction where the discharging head 100 being in motion is parallel with the tangent plane of the predetermined surface PS, the first work track OB1 and the predetermined surface PS have a fixed identical vertical distance H1 therebetween, and the vertical distance H1 is between 2 to 5 mm.

In prior art, during the three-dimensional spread process, the movement speed of the discharging head 100 remains the same speed, and the movement speed is not adjusted even if there are different geometric properties or surface properties of the predetermined surface PS. Compared to the prior art, when the discharging head 100 moves along the first work track OB1 to conduct the three-dimensional spread, the movement speed of the discharging head 100 corresponding on the curved surface or the small radius corner is faster than the movement speed of the discharging head 100 corresponding on the plane surface, such that the film 300 formed on the predetermined surface PS through the discharging head 100 has fine width and uniform thickness. Accordingly, this instant disclosure avoids the problem that the discharging head 100 remains using the identical movement speed to cause the jet stream to accumulate at the curved surface or the small radius corner, and further cause the film 300 to have uneven thickness. In the first embodiment of this instant disclosure, the method of manufacturing the three-dimensional object includes the steps spraying on the first surface S1 first and then the second surface S2, but it is not limited in this instant disclosure. For example, the second surface S2 can be sprayed at first, and the first surface S1 is then sprayed. If the second surface S2 can be sprayed at first and then the first surface S1 is sprayed, since the first surface S1 is a plane surface and the second surface S2 is a curved surface, the curvature radius of the second surface S2 is smaller than the curvature radius of the first surface S1. Therefore, the movement speed of the discharging head 100 on the second surface S2 is faster than the movement speed of the discharging head 100 on the first surface S1. In this way, after the discharging head 100 completes the second surface S2 spreading and continuously spreads on the first surface S1, and the movement speed of the discharging head 100 will be increased.

Second Embodiment

Figure 3A:
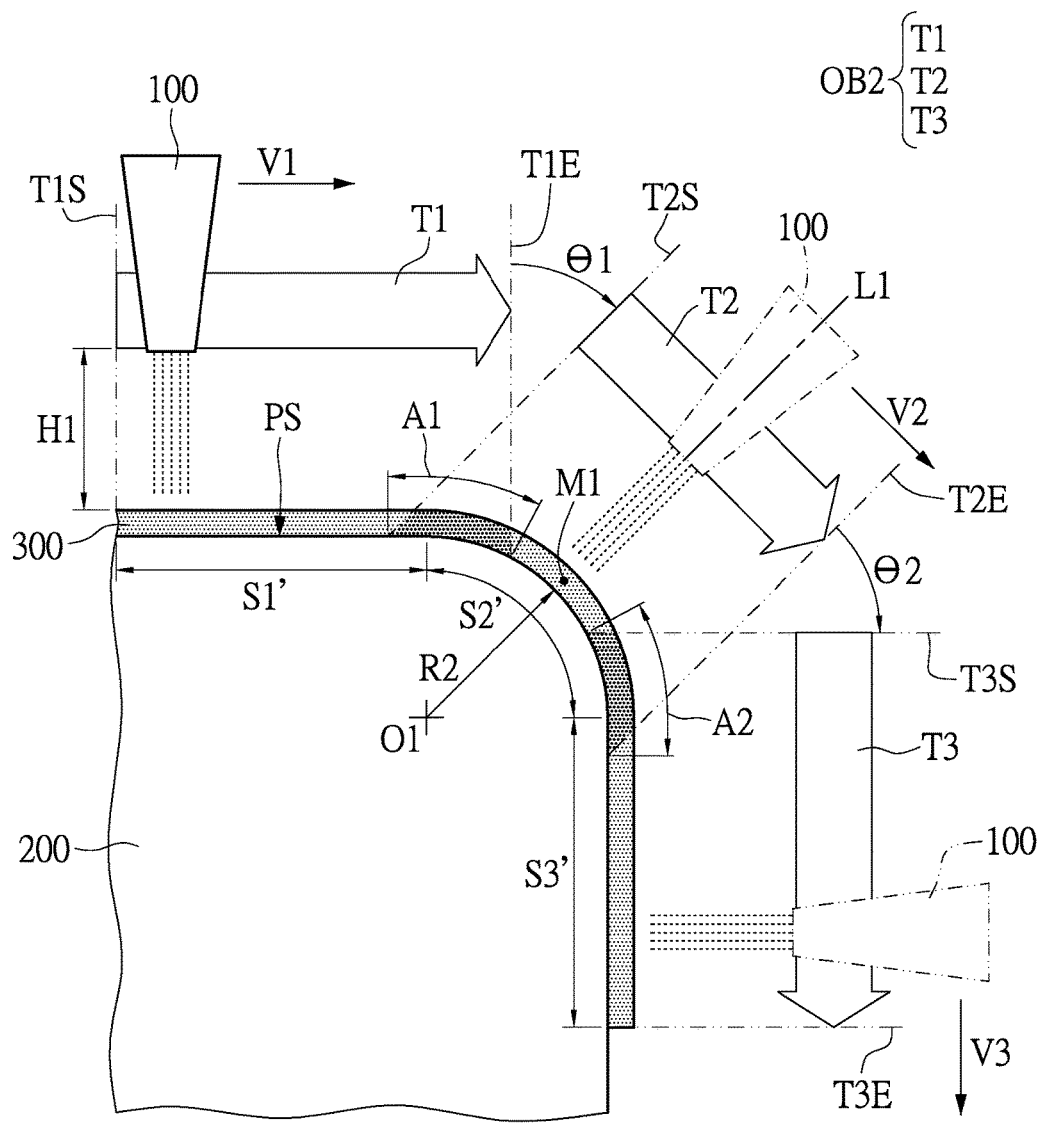
FIG. 3A shows a simple schematic view of a method of manufacturing a three-dimensional object of a second embodiment in the instant disclosure.
Figure 3B:
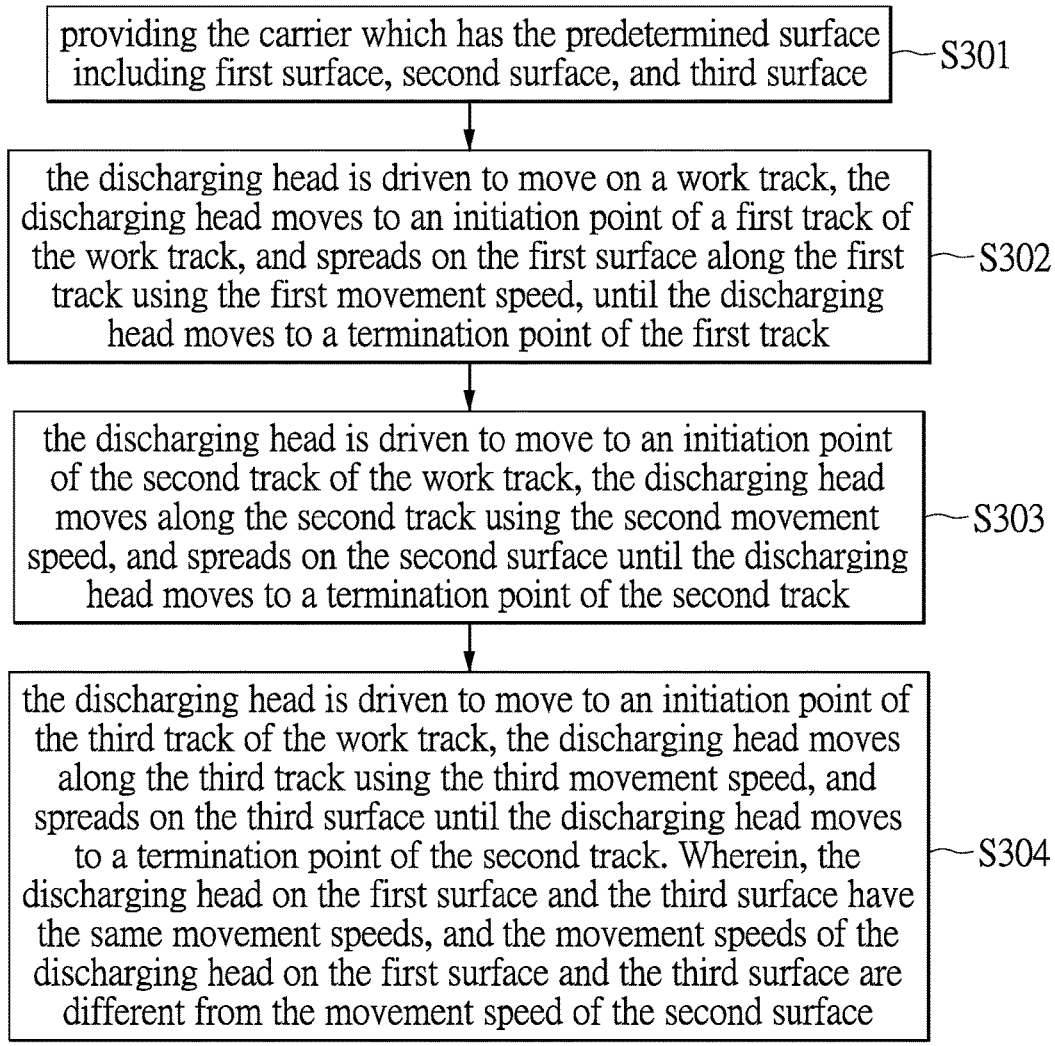
FIG. 3B show a flow chart of one of the methods of manufacturing a three-dimensional object of a second embodiment in the instant disclosure.

Please refer to FIGS. 3A and 3B. FIG. 3A shows a simple schematic view of a method of manufacturing a three-dimensional object of a second embodiment in the instant disclosure. FIG. 3B show a flow chart of one of the methods of manufacturing a three-dimensional object of a second embodiment in the instant disclosure. In step S301, providing the carrier 200 which has the predetermined surface PS including a first surface S1', a second surface S2', and a third surface S3'. Specifically, the carrier 200 has a curved surface or a small radius corner, the predetermined surface PS includes the first surface S1, the second surface S2, and the third surface S3, and they are connected in series with each other. Wherein the second surface S2 has a second radius R2, the second radius R2 is smaller than the first radius R1 in the first embodiment. In the second embodiment, the second surface S2 has a curved surface such as a quarter (¼) arc surface, but it is not limited in this instant disclosure. For example, the second surface S2 also can be a curved surface which has a curvature radius.

In step S302, the discharging head 100 is driven to move on a second work track OB2, the discharging head 100 moves to an initiation point T1S of a first track T1 of the second work track OB2, and spreads on the first surface S1 along the first track T1 using the first movement speed V1, until the discharging head 100 moves to a termination point T1E of the first track T1. The discharging head 100 still moves along the second work track OB2 to conduct the three-dimensional spread. Specifically, the second work track OB2 includes a first track T1, a second track T2, and a third track T3. The first track T1, the second track T2, and the third track T3 substantially correspond to the first surface S1', a part of the second surface S2', and the third surface S3', the first track T1 and the third track T3 respectively correspond to a part of the second surface S2'. A vertical distance H1 between the first track T1 and the first surface S1', a vertical distance H1 between the second track T2 and a tangent plane of the second surface S2', and a vertical distance H1 between the third track T3 and the third surface S3' are all the same. The vertical distance H1 is between 2 to 5 mm.

In detail, the discharging head 100 is driven to move along the first track T1 to the initiation point T1S of the first track T1, and moves along the first track T1 corresponding to the first surface S1' using the first movement speed V1 and spreads on the first surface S1', until the discharging head 100 moves to the termination point T1E of the first track T1, and the spraying process is stopped. Subsequently, in order to continuously conduct the spraying process of the second track T2, the discharging head 100 is rotated with an angle θ1. In detail, a central point M1 of the second surface S2' is firstly calculated, and a second radius R2 and a center of circle O1 of the small radius corner of the second surface S2' are obtained via the central point M1 of the second surface S2', and the second track T2 needs to be vertical with a connecting line L1 between the center of circle O1 and the central point M1. That is, the rotation angle θ1 of the discharging head 100 depends upon the radius size of the second radius R2 of the small radius corner of the second surface S2' and the position of the center of circle O1.

In step S303, the discharging head 100 is driven to move to an initiation point T2S of the second track T2 of the second work track OB2, the discharging head 100 moves along the second track T2 using the second movement speed V2, and spreads on the second surface S2' until the discharging head 100 moves to a termination point T2E of the second track T2. Specifically, the discharging head 100 moves to the initiation point T2S of the second track T2 at first, and then the discharging head 100 moves along the second track T2 and relatively to the second surface S2' with the second movement speed V2 to spread on the second surface S2' from the initiation point T2S of the second track T2 to the termination point T2E of the second track T2. Subsequently, in order to continuously conduct the spraying process of the third track T3, the discharging head 100 is rotated with an angle θ2. In detail, since the third track T3 is parallel to the third surface S3', therefore the rotation angle θ2 of the discharging head 100 is an included angle between the connecting line L1 and the third track T3.

In step S304, the discharging head 100 is driven to move to an initiation point T3S of the third track T3 of the second work track OB2, the discharging head 100 moves along the third track T3 using the third movement speed V3, and spreads on the third surface S3' until the discharging head 100 moves to a termination point T3E of the second track T3. Wherein, the discharging head 100 on the first surface S1' and the third surface S3' have the same movement speeds, and the movement speeds of the discharging head 100 on the first surface S1' and the third surface S3' are different from the movement speed of the second surface S2'.

Specifically, the discharging head 100 moves along the third track T3 and relative to the third surface S3' with the third movement speed V3 to spread on the third surface S3' from the initiation point T3S of the third track T3 to the termination point T3E of the third track T3. Similarly, in this embodiment, since the first surface S1' and the third surface S3' are both plane surfaces, and the second surface S2' is a curved surface, therefore, the first movement speed V1 is identical to the third movement speed V3, and the first movement speed V1 and the third movement speed V3 are slower than the second movement speed V2. However, in other embodiments, the second movement speed V2 also can faster than the first and third movement speeds V1, V3. In this way, due to the curvature radius of the second surface S2' is relative smaller than that of the first surface S1' and the third surface S3', the second movement speed V2 is adjusted to differ from the first movement speed V1 and the third movement speeds V3, so as to control to form the film 300 having an uniform thickness.

In this embodiment, the discharging head 100 conducts the three-dimensional spray process along the three tracks (the first, second, and third tracks T1, T2, T3), in practice, the three tracks (the first, second, and third tracks T1, T2, T3) where the discharging head 100 spraying thereon have no overlap. But, the first surface S1' corresponding to the first track T1 and the third surface S3' corresponding to the third track T3 have an overlap spraying range with the second surface S2' corresponding to the second track T2, hence, there are two portions of the film 300 deposited on the predetermined surface PS that are formed by repeatedly spraying thereon. As shown in FIG. 3A, an overlapping place A1 and an overlapping place A2 of the film 300.

Compared to prior art, when the discharging head 100 moves along the second work track OB2 to conduct the three-dimensional spread on the predetermined surface PS, the movement speed of the discharging head 100 corresponding on the curved surface or the small radius corner is faster than the movement speed of the discharging head 100 corresponding on the plane surface, such that the film 300 formed on the predetermined surface PS through the discharging head 100 has fine width and uniform thickness. Accordingly, this instant disclosure avoids the problem that, due to the discharging head 100 remains at the identical movement speed which causes the jet stream to accumulate at the curved surface or the small radius corner, and further causes the film 300 has uneven thickness. Compared to the first embodiment, the second radius R2 of the second surface S2' is smaller than the first radius R1 of the second surface S2 in the first embodiment. Therefore, when the second movement speed V2 is faster than the first and third movement speeds V1, V3, the thickness between the first surface S1' and the second surface S2' and the thickness between the third surface S3' and the second surface S2' might become thinner owing to the second movement speed V2 having faster speed, so as to cause the film 300 to have an uneven thickness. Accordingly, the second work track OB2 is divided into the first track T1, the second track T2, and the third track T3, and the three tracks (the first, second, and third tracks T1, T2, T3) respectively correspond to the spraying overlapping places of the first surface S1', the second surface S2', and the third surface S3' to overcome the problem that the film 300 has an uneven thickness owing to the small radius corner of the carrier 200 being accumulated with the spraying material.

Third Embodiment

Figure 4A:
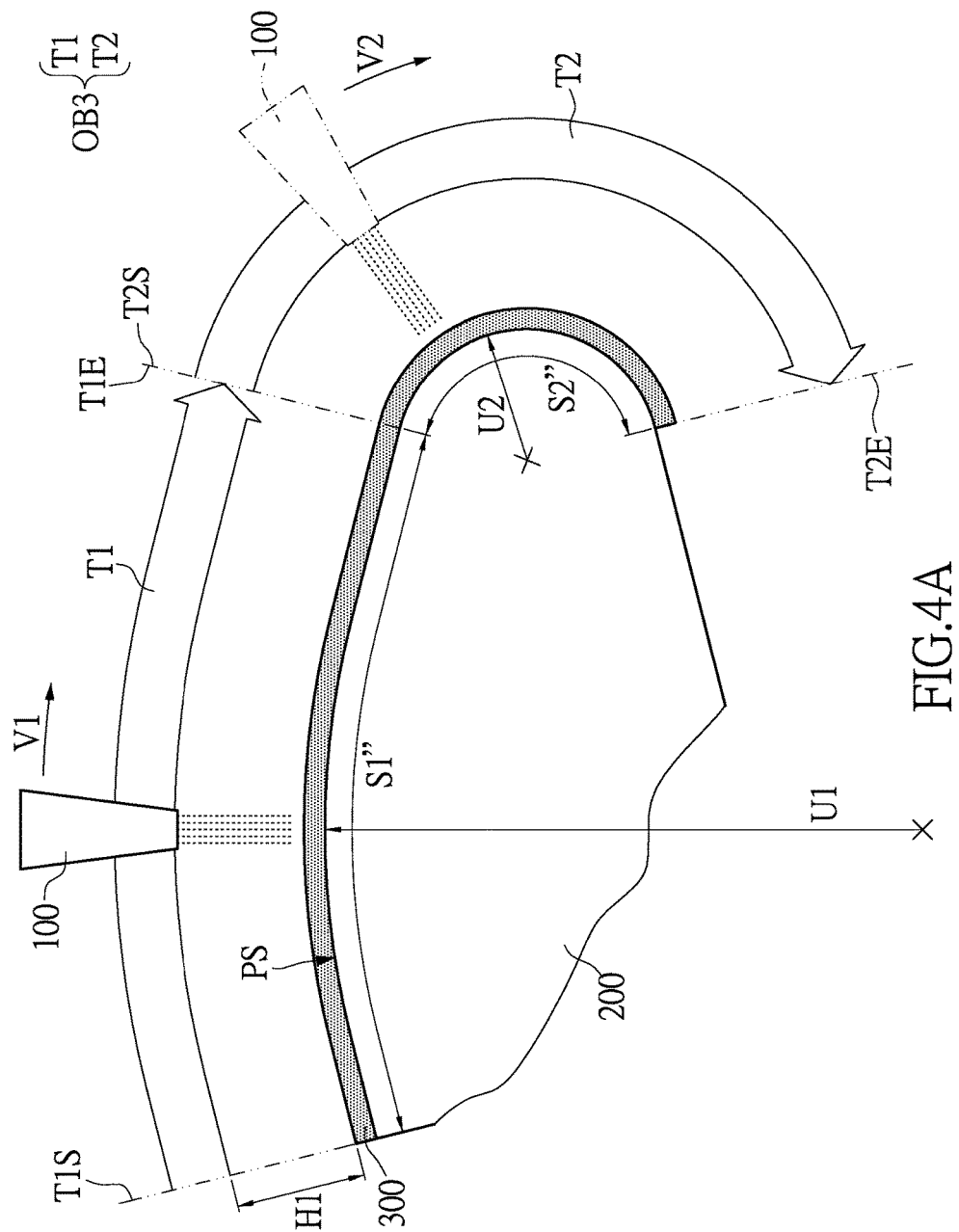
FIG. 4A shows a simple schematic view of a method of manufacturing a three-dimensional object of a third embodiment in the instant disclosure.
Figure 4B:
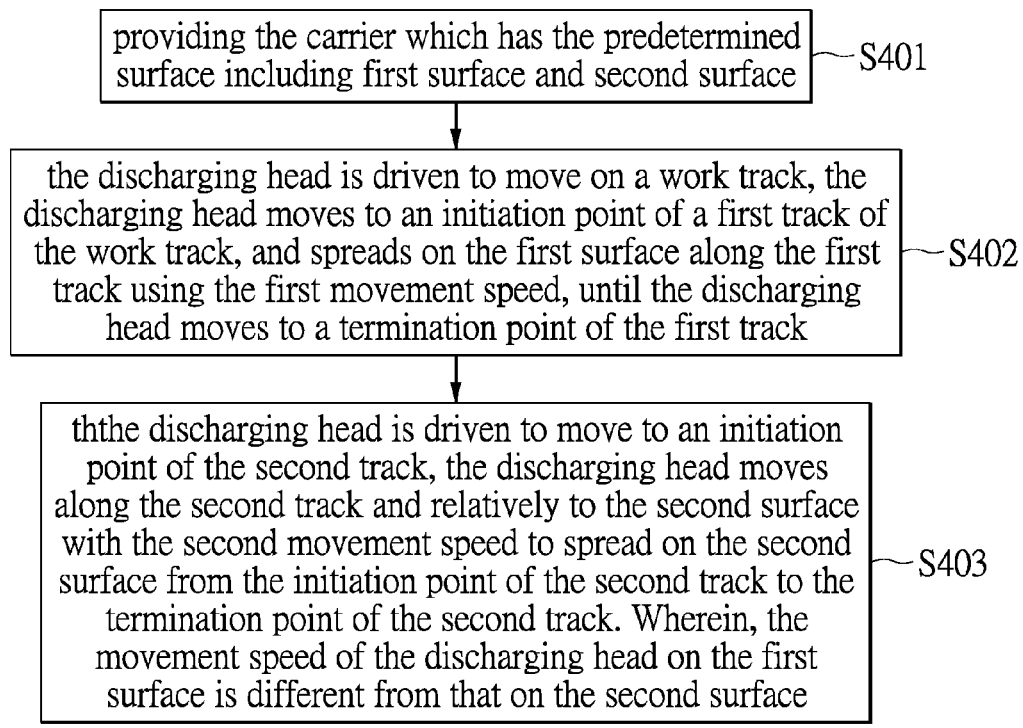
FIG. 4B show a flow chart of one of the methods of manufacturing a three-dimensional object of a third embodiment in the instant disclosure.

Please refer to FIGS. 4A and 4B. FIG. 4A shows a simple schematic view of a method of manufacturing a three-dimensional object of a third embodiment in the instant disclosure. FIG. 4B show a flow chart of one of the methods of manufacturing a three-dimensional object of a third embodiment in the instant disclosure.

In step S401, providing the carrier 200 which has the predetermined surface PS including a first surface S1" and a second surface S2". For example, the first surface S1" and the second surface S2" are connected in series with each other. Wherein, the first surface S1" has a first curvature radius U1 and the second surface S2" has a second curvature radius U2, and the first curvature radius U1 and the second curvature radius U2 are different from each other. In other words, the first surface S1" and the second surface S2" have the curved surfaces with different curvature radiuses respectively.

In step S402, the discharging head 100 is driven to move on a third work track OB3, the discharging head 100 moves to an initiation point T1S of a first track T1 of the third work track OB3, and spreads on the first surface S1" along the first track T1 using the first movement speed V1, until the discharging head 100 moves to a termination point T1E of the first track T1. Specifically, the discharging head 100 moves along the third work track OB3 to conduct the three-dimensional spread. More specifically, the third work track OB3 includes a first track T1 and a second track T2. The first track T1 and the second track T2 substantially correspond to the first surface S1" and the second surface S2". A vertical distance H1 between the first track T1 and the first surface S1", and a vertical distance H1 between the second track T2 and the second surface S2" are identical with each other. The vertical distance H1 is between 2 to 5 mm. In details, the discharging head 100 is driven to move along the first track T1 to the initiation point T1S of the first track T1, and moves along the first track T1 corresponding to the first surface S1" using the first movement speed V1 and spreads on the first surface S1", until the discharging head 100 moves to the termination point T1E of the first track T1, and the spraying process is stopped.

Subsequently, in step S403, the discharging head 100 is driven to move to an initiation point T2S of the second track T2, next, the discharging head 100 moves along the second track T2 and relatively to the second surface S2" with the second movement speed V2 to spread on the second surface S2" from the initiation point T2S of the second track T2 to the termination point T2E of the second track T2, and the spraying process is stopped. Since the first curvature radius U1 of the first surface S1" is different from the second curvature radius U2 of the second surface S2", therefore, the first movement speed V1 of the discharging head 100 on the first surface S1" is different from the second movement speed V2 of the discharging head 100 on the second surface S2".

If the divergence between the first curvature radius U1 and the second curvature radius U2 is large, the discharging head 100 can be rotated with an angle θ1 to spray in the second surface S2" (as described in the above embodiment), but it is not limited in this instant disclosure. For example, after the step S402 is completed, the carrier 200 can be rotated with an angle to continuously conduct the step S403. According to the above description, referring to FIG. 4B, the carrier 200 rotated with an angle has a rotation speed which depends upon the movement speed of the discharging head 100 and the radius size of the second curvature radius U2, for example, when the radius size is smaller and the rotation speed is faster. The first movement speed V1, the second movement speed V2, and the rotation speed of the carrier 200 depend upon the radius sizes of the first curvature radius U1 and the second curvature radius U2, and are related to the predetermined surface PS of the carrier 200 having a geometric property, surface texture, and material property. The first movement speed V1, the second movement speed V2, and the rotation speed of the carrier 200 can be calculated to control them through a processor (not shown).

Via the method of manufacturing a three-dimensional object provided from the above first, second, and third embodiments, a three-dimensional object can be obtained, wherein the second surface (S2, S2', S2") of the three-dimensional object has a radius which is between 0.05 to 2 mm, the three-dimensional spread is conducted on the three-dimensional object to form a spreaded layer, the spreaded layer has a thickness between 5 to 20 μm. In other words, the three-dimensional object obtained from the above embodiments has a curved surface with a radius between 0.05 to 2 mm.

By applying the above processes, this instant disclosure can provide the embodiments of the method of manufacturing the three-dimensional object. In the spirit of the instant disclosure, most of the manufacturing steps and order can be modified depending upon different manufacturing conditions or machines. Specifically, when the discharging head 100 sprays on an intersection between the plane surface and the curved surface, the movement speed of the discharging head 100 is changed. In other words, when the work track of the discharging head 100 has an alternation of the curvature radius, the movement speed of the discharging head 100 is changed. In such a way, the movement speed of the discharging head 100 spraying on the curved surface is slower than the movement speed of the discharging head 100 spraying on the plane surface. In other words, when the discharging head 100 has the curved surface with smaller curvature radius, the movement speed needs to be faster. Otherwise, when the discharging head 100 has the curved surface with larger curvature radius, the movement speed can be slower.

In summary, the first embodiment of this instant disclosure provides a method of manufacturing a three-dimensional object, and the three-dimensional object can be manufactured on the carrier having the small radius corner. The discharging head 100 conducts the three-dimensional spread on the first surface S1 with the first movement speed V1, the discharging head 100 conducts the three-dimensional spread on the second surface S2 with the second movement speed V2, and the discharging head 100 conducts the three-dimensional spread on the third surface S2 with the third movement speed V3. The first movement speed V1 is identical to the third movement speed V3, and the first movement speed V1 and the third movement speed V3 are both slower than the second movement speed V2. In prior art, the movement speed of the discharging head 100 remains the same speed, and the movement speed is not adjusted even if there are different geometric properties or surface properties of the predetermined surface PS. Compared to the prior art, when the discharging head 100 moves along the first work track OB1 to conduct the three-dimensional spread on the predetermined surface PS, the movement speed of the discharging head 100 corresponding on the curved surface or the small radius corner is faster than the movement speed of the discharging head 100 corresponding on the plane surface, such that the film 300 formed on the predetermined surface PS through the discharging head 100 has fine width and uniform thickness. Accordingly, this instant disclosure avoids the problem that, due to the discharging head 100 remains at the identical movement speed to cause the jet stream to accumulate at the curved surface or the small radius corner, and further to cause the film 300 to have an uneven thickness.

In addition, this instant disclosure provides the second embodiment, compared to the first embodiment, the second radius R2 of the second surface S2' is smaller than the first radius R1 of the second surface S2 in the first embodiment. Thus, the second work track OB2 is divided into the first track T1, the second track T2, and the third track T3, the three tracks (the first, second, and third tracks T1, T2, T3) respectively correspond to the spraying overlapping places of the first surface S1', the second surface S2', and the third surface S3' to overcome the problem that, the film 30 has an uneven thickness owing to the small radius corner of the carrier 200 being accumulated with the spraying material.

Furthermore, this instant disclosure provides the third embodiment, compared to the abovementioned first and second embodiments, via spreading on the carrier 200 having two different curvature radiuses, and via the alternation between the first movement speed V1 of the third work track OB3 corresponding on the first surface S1" and the second movement speed V2 of the third work track OB3 corresponding on the second surface S2", the problem of the carrier 200 having an uneven thickness can be improved.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A method of manufacturing a three-dimensional object, comprising:
    providing a carrier which has a predetermined surface, the predetermined surface including a first surface, a second surface, and a third surface; and
    driving a discharging head to move on a work track and conduct a three-dimensional spread corresponding to the first surface, the second surface, and the third surface, wherein the predetermined surface and the work track have an identical spacing therebetween;
    wherein the discharging head moves relative to the first surface using a first movement speed and conducts the three-dimensional spread, the discharging head moves relative to the second surface using a second movement speed and conducts the three-dimensional spread, the discharging head moves relative to the third surface using a third movement speed and conducts the three-dimensional spread, the first movement speed is identical to the third movement speed, and the second movement speed is different from the first and third movement speeds.

2. The method of manufacturing the three-dimensional object as claimed in claim 1, wherein the first surface, the second surface, and the third surface are connected in series with each other, the first surface is a plane surface, the second surface is a curved surface, and the third surface is a plane surface.

3. The method of manufacturing the three-dimensional object as claimed in claim 2, wherein the second surface is a semicircle surface.

4. The method of manufacturing the three-dimensional object as claimed in claim 1, wherein the work track includes a first track, a second track, and a third track, the first track, the second track, and the third track respectively correspond to the first surface, a part of the second surface, and the third surface.

5. The method of manufacturing the three-dimensional object as claimed in claim 4, wherein a vertical distance between the first track and the first surface, a vertical distance between the second track and a tangent plane of the second surface, and a vertical distance between the third track and the third surface are all the same.

6. The method of manufacturing the three-dimensional object as claimed in claim 4, wherein steps of driving the discharging head to move on the work track and conduct the three-dimensional spread corresponding to the first surface, the second surface, and the third surface further comprise:
    the discharging head moving to an initiation point of the first track and spreading on the first surface along the first track using the first movement speed, until the discharging head moves to a termination point of the first track;
    the discharging head moving to an initiation point of the second track and spreading on the second surface along the second track using the second movement speed, until the discharging head moves to a termination point of the second track; and
    the discharging head moving to an initiation point of the third track and spreading on the third surface along the third track using the third movement speed, until the discharging head moves to a termination point of the third track.

7. The method of manufacturing the three-dimensional object as claimed in claim 6, wherein the second surface is a quarter arc surface.

8. A method of manufacturing a three-dimensional object, comprising:
    providing a carrier which has a predetermined surface, the predetermined surface including a first surface and a second surface; and
    driving a discharging head to move on a work track and conduct a three-dimensional spread corresponding to the first surface and the second surface, wherein the predetermined surface and the work track have an identical spacing therebetween;
    wherein the discharging head moves relative to the first surface using a first movement speed and conducts the three-dimensional spread, the discharging head moves relative to the second surface using a second movement speed and conducts the three-dimensional spread, and the second movement speed is different from the first movement speeds.

9. The method of manufacturing the three-dimensional object as claimed in claim 8, wherein the work track includes a first track and a second track, the first track and the second track respectively correspond to the first surface and the second surface, the first surface has a first curvature radius, the second surface has a second curvature radius, and the first curvature radius and the second curvature radius are different from each other.

* * * * *